United States Patent
Robert

(10) Patent No.: US 7,323,268 B2
(45) Date of Patent: Jan. 29, 2008

(54) BATTERY WITH MINIATURISED SOFC FUEL CELLS

(75) Inventor: Gilles Robert, Zurich (CH)

(73) Assignee: Cerion AG, Zurich (CH)

(*) Notice: Subject to any disclaimer, the term of this patent is extended or adjusted under 35 U.S.C. 154(b) by 595 days.

(21) Appl. No.: 10/772,918

(22) Filed: Feb. 4, 2004

(65) Prior Publication Data
US 2004/0161650 A1 Aug. 19, 2004

(30) Foreign Application Priority Data
Feb. 18, 2003 (EP) .................... 03405091

(51) Int. Cl.
*H01M 8/12* (2006.01)
(52) U.S. Cl. .................. 429/32; 429/13; 429/33
(58) Field of Classification Search ............ 429/32–33, 429/13
See application file for complete search history.

(56) References Cited

U.S. PATENT DOCUMENTS 5,641,585 A 6/1997 Lessing et al.

2003/0012994 A1 1/2003 Kushibiki et al.
2003/0054215 A1* 3/2003 Doshi et al. ............. 429/26

FOREIGN PATENT DOCUMENTS

WO WO 00/45457 A 8/2000

* cited by examiner

*Primary Examiner*—Gregg Cantelmo
(74) *Attorney, Agent, or Firm*—Townsend and Townsend and Crew LLP

(57) ABSTRACT

A power source with miniaturized SOFC fuel cells has: a stack (20) made up of the fuel cells (2), the volume of which is less than $10^{-3} m^3$; a channel system (24, 25, 26) in which reactants, namely gaseous fuel (50) and also air (40), can be fed to the cells (2) and the fuel that is partially depleted in the cells is subjected to afterburning; a casing (10, 11) and a heat exchanger (6) where supplied air can be heated up with the exhaust gas (60) from the afterburning. The fuel cells contain a disc-shaped solid electrolyte (30) which in addition to ion conducting components also includes electron conducting components which cause an ohmic loss. In this way the quantity ratio of these components is so designed that in an idling operation of the power source a heat flow from the cells to the environment can be compensated by the ohmic loss.

10 Claims, 2 Drawing Sheets

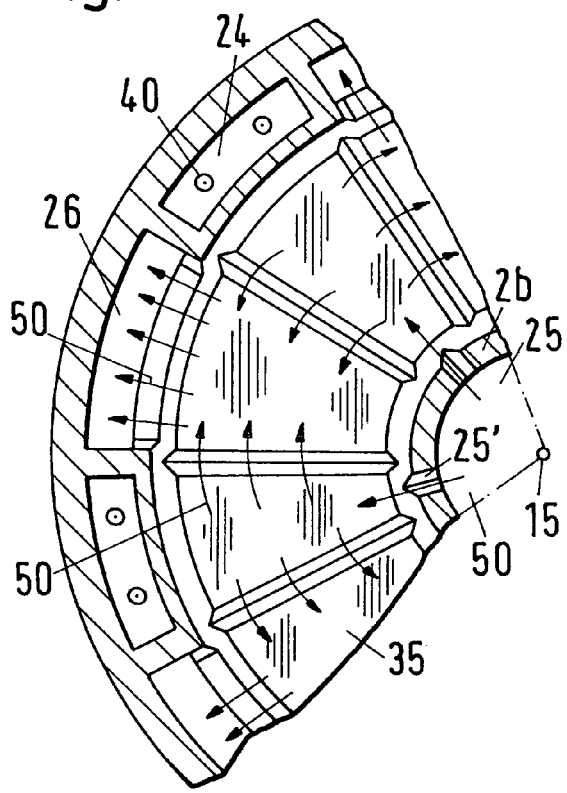
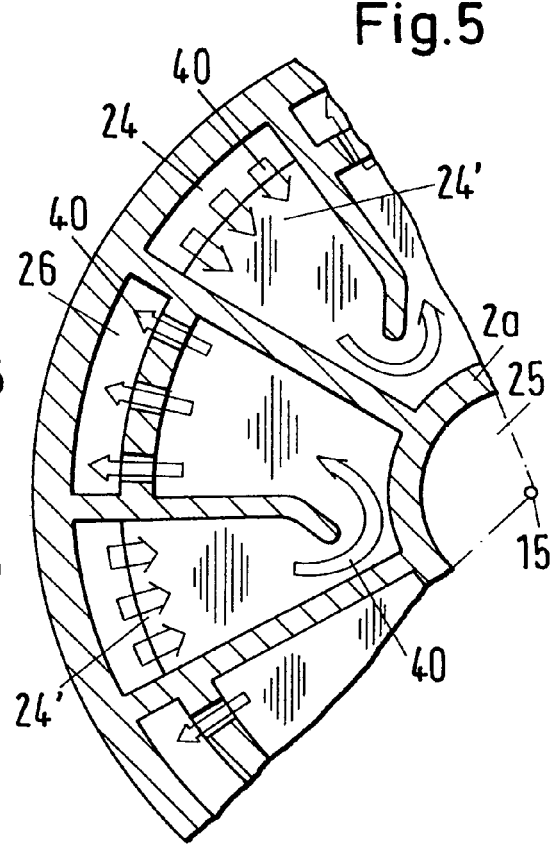
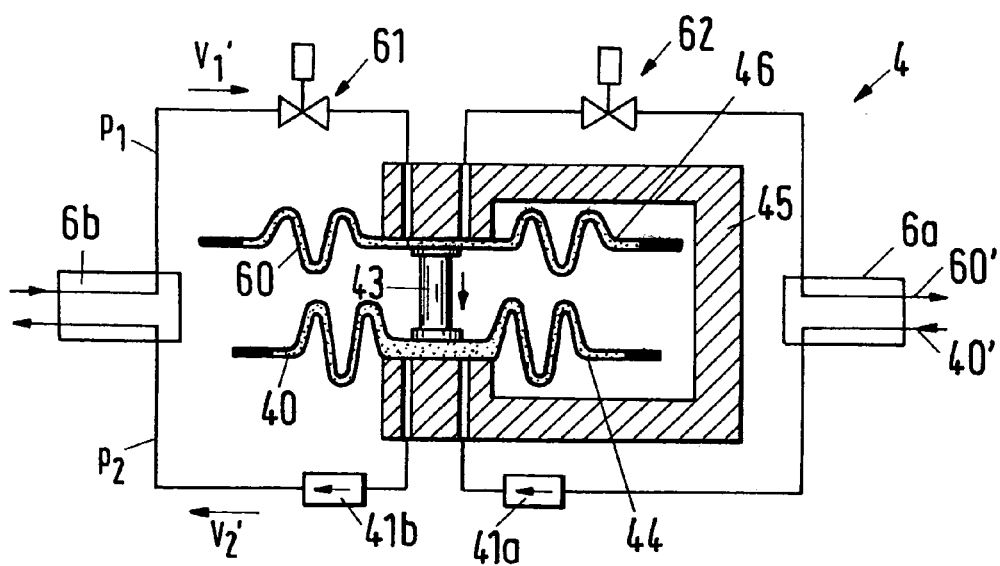

BATTERY WITH MINIATURISED SOFC FUEL CELLS

BACKGROUND OF THE INVENTION

The invention relates to a power source with miniaturized SOFC fuel cells (SOFC: solid oxide fuel cell). The power source contains the fuel cells in the form of a multi-modular unit, in particular in the form of a stack, the volume of which is preferably less than $10^{-4}$ m$^3$. The invention also relates to a method for operation of the power source as well as for uses for the power source.

Portable electronic devices are at a stage of development in which these devices are becoming increasingly complicated and are being integrated into systems which are more and more complex. Due to the increase in complexity the need for electrical energy for operating the devices or systems is growing all the time. Conventional power sources, which are re-loadable, reach the limits of their capacity. Therefore power sources with miniaturized fuel cells are suggested, with which the named limits of capacity can be exceeded. Since power sources of this kind have to be relatively small, it is difficult to use electrochemical processes, which take place at high temperatures. For this reason miniaturized fuel cells are being developed, which work with polymer membranes at low temperatures (cells of the type PEMFC: proton exchange membrane fuel cell). In membranes of this kind a minimum water content has to be maintained however. This requirement is difficult to fulfill. Hydrogen is used as a fuel, which is a disadvantage with regard to storage, since only relatively small energy densities are possible with stored hydrogen.

Due to the problems with the PEMFC fuel cells, SOFC fuel cells have also been suggested, in spite of the known difficulties (see for example WO 0243177). In these fuel cells the membranes are made of solid electrolytes, which only have sufficiently high ionic conductivity at temperatures higher than 500° C. Propane or butane, which advantageously have relatively high energy densities in liquid form, can be used as fuels for example.

SUMMARY OF THE INVENTION

An object of the present invention is to produce a further power source with miniaturized SOFC fuel cells, which can be used as a mobile source for electrical energy.

The power source with miniaturized SOFC fuel cells includes the following components: a stack made up of the fuel cells or another multi-modular unit, with a volume which is less than $10^{-3}$ m$^3$, preferably less than $10^{-4}$ m$^3$; a channel system in the channels of which on the one hand reactants, namely gaseous fuel and also air, can be fed to the cells and on the other hand the fuel, which is partially depleted in the cells, can be subjected to afterburning; a casing, which is made at least partially heat insulating; a heat exchanger, which is part of the channel system and in which the air supplied can be heated up with exhaust gas; an apparatus for feeding the air; an exchangeable or refillable reservoir for the fuel, which is stored in this at a pressure, which is greater than the environmental pressure and in which the fuel is preferably liquid; controlled valves in connection lines for the reactants; and a control. The afterburning is not necessarily required. The fuel cells respectively contain a disc-shaped solid electrolyte, which in addition to ion conducting components also includes electron conducting components, which cause an ohmic loss. In this the quantity ratio of these components is so designed that in an idling operation of the power source a heat flow from the cells to the environment can be compensated by the ohmic loss.

BRIEF DESCRIPTION OF THE DRAWINGS

In the following the invention is explained on the basis of the drawings.

FIG. 4 is a section through a cell stack with a view of the anode, FIG. 5 is a section through a cell stack with a view of the cathode, and FIG. 6 shows an apparatus for the feeding of the air.

DESCRIPTION OF THE PREFERRED EMBODIMENTS

Figure 1:
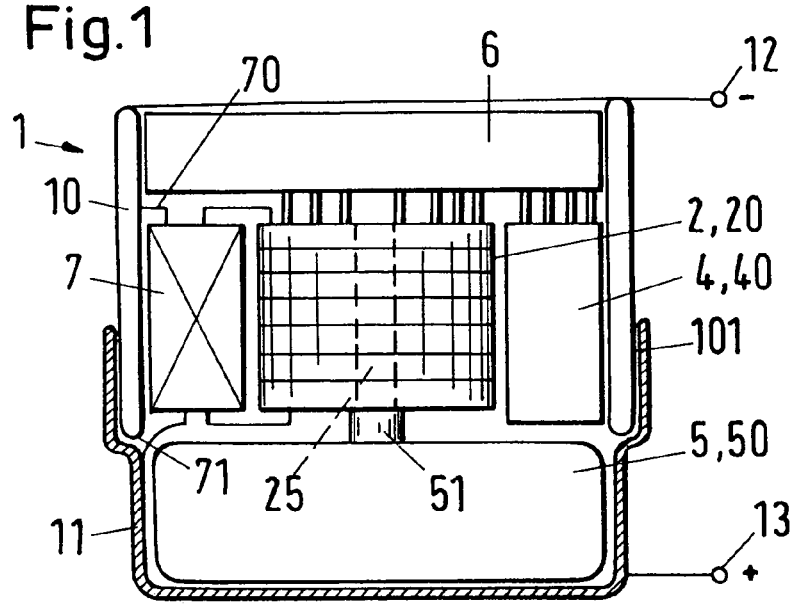
FIG. 1 is an overview of the components of a power source in accordance with the invention.

The overview given by FIG. 1 shows the following components of a power source (battery) 1 in accordance with the invention: a cylindrical stack 20 with fuel cells 2; an apparatus 4 for the transport of air; a heat insulating casing part 10, which is shown as a longitudinal section; an exchangeable or refillable reservoir 5 for a fuel 50; a heat exchanger 6; a condenser 7; and a shell-like casing part 11, which can be plugged on to the heat insulating casing part 10 (plug region 101). The casing parts 10 and 11 are advantageously made of metal. If the casing parts 10 and 11 are electrically separated with an insulation in the plug region 101, then—with suitable connections 70 and 71 at the condenser (for example)—they can be used as poles 12 and 13 of the power source.

The fuel cells can also form another multi-modular unit instead of a stack 20. In a multi-modular unit of this kind the cells 2 can for example be arranged in one layer or in at least one layer next to each other (not shown).

The fuel 50 (FIG. 2) can be let out of the reservoir 5 via a controllable valve 51 into a central distributing tube 25 of the cell stack 20. The power source component for a control is not illustrated. The reservoir 5 is exchangeable or refillable. The fuel 50 is stored at a pressure, which is greater than the environmental pressure and in which the fuel 50 is advantageously present as a liquid phase. The power source 1 in accordance with the invention includes a channel system, into the channels of which the reactants, on the one hand, namely the gaseous fuel 50 and also the air 40, can be led to the cells 2 and, on the other hand, the fuel, which is partially depleted in the cells 2, can be subjected to afterburning. The afterburning can be carried out catalytically at temperatures higher than 250° C.

In the described embodiment the solid electrolyte is circular. The cell stack 20 can also be of prismatic form, for example with a quadratic base surface, so that the solid electrolyte must have a correspondingly quadratic shape. Instead of the separate apparatus 4 for transporting the air 40, other transport means are also possible, namely for example a system of jets integrated in the cell stack 20, in which the gaseous fuel can be used for the air transport, using its pressure as the driving power.

Figure 2:
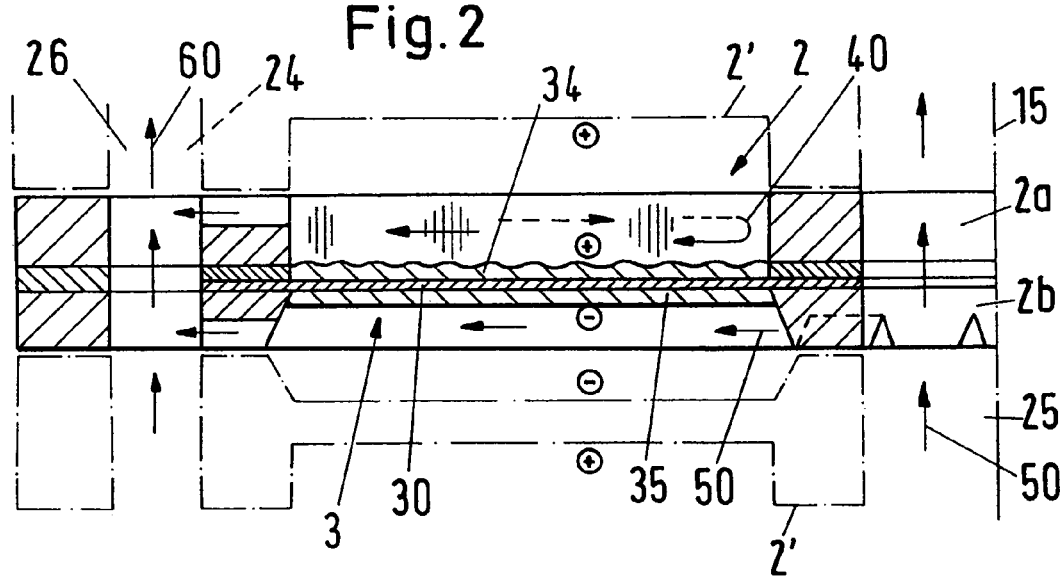
FIG. 2 is a cross-section through a part of a fuel cell.

In FIG. 2 a section of a part of the fuel cell 2 lying to the left of a middle line 15 i.e. of the central axis of the stack 20 is shown. This cell is made of a structured part 2a, a second structured part 2b and an electrochemically active element 3, which includes a membrane 30 of a solid electrolyte and also two layer-like electrodes, namely a cathode 34 and an anode 35. The architecture of the two parts 2a and 2b can be seen in FIGS. 4 and 5. They form mechanically stable support structures for the solid electrolyte membranes 30, which are homogenous and unstructured and can preferably be manufactured from mono-crystalline silicon. This material is structured by means of micro-technical methods, in particular etching methods (for example "back-etching" of the part 2b on the anode side; see for example the already named WO 0243177).

Figure 3:
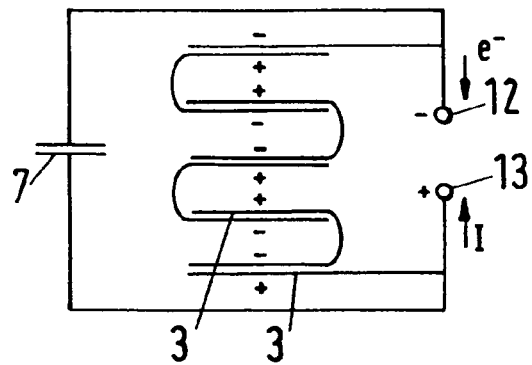
FIG. 3 is a schematic view of the electrical connections of the cells.

Neighboring cells 2 and 2' (shown in chain-dotted lines) are respectively arranged in relation to one another in mirror symmetry, so that electrodes 34 and 35 of the same name cover the inner surfaces of common electrode gas chambers for the air 40 or for the fuel 50. FIG. 3 shows how in this arrangement the electrodes 34 or 35 have to be connected with each other electrically in order to maintain a series circuit, for which terminal voltage between the poles 12 and 13 is equal to the sum of the individual voltages of the electrochemically active elements 3.

During operation of the power source (battery) the air 40 is distributed through axial channels 24, which are arranged in the peripheral region of the cells 2: see FIGS. 2 and 5. The air 40 flows into the cells 2 initially radially from feed points 24' radially towards the central axis 15 and is then steered back to the periphery. The oxygen ions migrate through the solid electrolyte membrane 30 to the anode 35, where they react with the fuel 50 giving up the excess electrons to form water $H_2O$ and $CO_2$. The fuel 50, which is distributed by means of the central channel 25, reaches the electrode gas chambers lined with the anodes 35 via radial channels 25': see FIGS. 2 and 4. After the transport through the electrode gas chambers, the air 40 and fuel 50 enter common channels 26, which are axially arranged between the air channels 24 and in which an afterburning of the only partially depleted fuel 50 to form a hot exhaust gas 60 takes place.

In accordance with the invention, the disc-shaped solid electrolyte 30 contains electron conducting components which cause an ohmic loss, as well as ion conducting components. The quantity ratio of these components is such that in an idling operating state of the power source 1, heat transfer from the cells to the environment can be compensated for by the ohmic loss. In the case of a lack of need for electrical power, the feeding of the reactants 40, 50 into the fuel cells 2 is maintained at a low level, so that the temperature in the cells 2 remains high in this idling operating state. This temperature should be so high that a transfer from the idling operating state into the energy-delivering normal operation is possible within a predeterminable length of time. This length of time amounts to 10 minutes for example, preferably less than one minute. In the energy-delivering operation (electrical power approximately 1 W: heating power approximately 1.5 W) the outside of the power source 1 should not be warmer than approximately 30° C., and in the idling state (heating power approximately 0.05 W; heating power approximately 0.3 W) it should be less warm, for example 25° C. Thus in the idling state the temperature of the cells 2 is less than in the energy-delivering normal operating state. The difference between the temperatures in the normal operating state and in the idling state is preferably less than 100 K.

The solid electrolyte with mixed conduction can be made of $Sr_4Fe_6O_{13}$, which is doped with La and/or Ti; it can be a perovskite of the composition $(La, Sr)(Co, Fe)O_3$; or preferably cerium oxide $CeO_{2-\epsilon} (\epsilon \leq 0.2)$, which is doped with Gd, Y and/or Sm. The transference number of the oxygen ions during simultaneous transport of oxygen ions and electrons has to assume a value between 0.6 and 0.9. (The transference number shows the ratio between the current of the oxygen ions and that of the electrons.) In this arrangement the transference number has to be measured at operating temperature.

The power source in accordance with the invention advantageously includes a condenser 7, in particular a super-condenser (see FIGS. 1 and 3), by means of which the peaks of the power requirement, which as a rule occur intermittently, can be covered.

The fuel 50 is advantageously butane or propane. The power source 1 has a capacity determined by the amount of fuel. With a full fuel reservoir 5, the capacity of the power source 1 is at least 3,000 mAh. The fuel cells 2 connected in series produce a terminal voltage of 3.6 V. The power source has a diameter between 2 cm and 3 cm and a height between 2.5 cm and 3.5 cm.

FIG. 6 shows a schematic representation of an apparatus 4 for transporting the air 40, which is sucked in at an inlet point 40'. Two containers 44 and 46 of different size, which are designed like bellows, which are coupled by rigid connections 43 and 45 and the volumes of which can be altered between a minimum volume, which is almost zero, and a maximum volume, are used for sucking in. The volumes change in opposition to one another. In a first step the larger container 46 is filled with exhaust gas 60 from the power source: valve 61 is open; valve 62 is closed; volume flow $V_1$'; pressure $p_1$. Air 40 is transported into the power source 1 from the smaller, rigidly coupled container 44: non-return valve 41a is closed; non-return valve 41b is open; volume flow $V_2$'; pressure $p_2$. At the same time $V_2$' is $<V_1$'; $p_2>p_1$. The interior pressure of the power source $p_1$ is greater than the environmental pressure. The air 40 absorbs heat in the power source 1, wherein a volume increase and pressure rise occur. The chemical reactions, which take place in the power source (electrode reactions, afterburning), likewise contribute to an increase in volume and rise in pressure. In a second step the larger container 46 is emptied: valve 61 is closed; valve 62 is open. Coupled with this, air 40 is sucked in from the environment through the container 44. The exhaust gas 60 leaves the apparatus 4 at an exit point 60'. The air 40 which has been supplied is pre-heated in two heat exchangers 6a and 6b with the exhaust gas 60 transported in the counter-flow.

Further mechanisms for feeding the air 40 into the electrode gas chambers are possible. It is generally applicable that an overpressure $p_2$ or $p_1$ is produced in the gas-filled fuel cells 2 and channels by means of organs, which can act on the transport of the air and the exhaust gas. In this way the air supplied as a heat sink and as a reactant together with the fuel has a thermodynamic working effect on the gases. A part of the pressure energy, which is stored in the exhaust gas, is used in this to transport the air through the apparatus. A further example for a transport apparatus of this kind is a "quasi gas turbine". Air is sucked in with a first micro-turbine. The second micro-turbine drives the first one. The exhaust gas flows away via the second micro-turbine while generating work. The reaction and combustion chambers of the power source have the function of a combustion chamber in a gas turbine in this arrangement. A method for the manufacture of micro-turbines is described in U.S. Pat. No. 6,363,712 (Sniegowski et al.).

Power source 1 in accordance with the invention can be used as a mobile energy source for electronic devices, which require a relatively high and regular energy supply. It can also be used as a substitute for re-chargeable loadable power sources.

The invention claimed is:

1. A power source with SOFC fuel cells, including the following components:
    a multi-modular unit formed with the fuel cells as modules, the volume of which is less than $10^3$ m$^3$,
    a channel system comprising a first kind of channels by which reactants, namely gaseous fuel and also air, can be fed to the fuel cells and a second kind of channels by which the partially depleted fuel can be discharged from the fuel cell and which second kind of channels is acting as an afterburner stage for the partially depleted fuel,
    a casing, which is at least partially made heat insulating,
    a heat exchanger which is part of the channel system and in which the air supplied can be heated up with exhaust gas,
    an apparatus or means for feeding the air,
    an exchangeable or refillable reservoir for the fuel, in which reservoir the fuel is stored at a pressure which is greater than a pressure present at the exterior of the power source and in which the fuel is preferably liquid,
    controlled valves in connection lines for the reactants, and
    a control,
    wherein the fuel cells respectively contain a disc-shaped solid electrolyte, which in addition to ion conducting components also includes electron conducting components which cause an ohmic loss and wherein the ratio of the ion conducting components to the electron conducting components is so designed that in an idling operation of the power source a heat flow from the cells to an environment can be compensated by the ohmic loss.

2. A power source in accordance with claim 1, characterized in that the solid electrolyte is made up of $Sr_4Fe_6O_{13}$ doped with La and/or Ti, that it is a perovskite of the composition (La, Sr)(Co, Fe)O$_3$ or that it is cerium oxide doped with Gd, Y and/or Sm, wherein the transfer number of the oxygen ions measured at the operating temperature with simultaneous transport of the oxygen ions and electrons has a value between 0.6 and 0.9 and in that mechanically stable support structures for the disc-shaped solid electrolytes are manufactured from crystalline silicon, which has been structured on the micrometer length scale.

3. A power source in accordance with claim 1, characterized in that it includes a condenser, in particular a super condenser, by means of which peaks of the power requirement, which occur intermittently, are covered and that the condenser at least partially produces a heat insulation in the casing.

4. A power source in accordance with claim 1, characterized in that an overpressure is produced in the gas-filled fuel cells and channels by means of organs with which the transport of the air and of the exhaust gas can be affected, wherein the air supplied as a heat sink and also as a reactant together with the fuel effects a thermodynamic working performance on the gases, and a part of the pressure energy, which is stored in the exhaust gas, is used in the apparatus for supplying the air.

5. A power source in accordance with claim 1, characterized in that the fuel is butane or propane.

6. A power source in accordance with claim 1, characterized in that it has a capacity given by the amount of fuel, that when the fuel reservoir is fall the capacity of the power source amounts to at least 3,000 mAh, that the fuel cells switched in series produce a terminal voltage of 3.6 V and that the power source has a diameter of between 2 cm and 3 cm and a height of between 2.5 cm and 3.5 cm.

7. A method for operating the power source in accordance with claim 1, characterized in that, when there is no requirement for electric power, the feeding to the reactants into the fuel cells is maintained at a low level, so that in this idling state the temperature in the cells remains on such a level that a transfer from the idling state into an energy-delivering normal operating state occurs within a pre-given length of time, wherein this length of time is 10 minutes.

8. A method in accordance with claim 7, characterized in that in the idling state the temperature of the cells is less than in the energy-delivering normal operating state and that the difference between the temperatures in the normal operating state and in the idling state is advantageously less than 100° K.

9. A power source in accordance with claim 1, characterized in that the multi-modular unit formed with the fuel cells as modules is less than $10^{-4}$ m$^3$.

10. A method in accordance with claim 7, characterized in that the transfer from the idling state into an energy-delivering normal operating state occurs within a pre-given length of time, wherein this length of time is one minute.

* * * * *

UNITED STATES PATENT AND TRADEMARK OFFICE
CERTIFICATE OF CORRECTION

| | |
|---|---|
| PATENT NO. | : 7,323,268 B2 |
| APPLICATION NO. | : 10/772918 |
| DATED | : January 29, 2008 |
| INVENTOR(S) | : Giles Robert |

Page 1 of 1

It is certified that error appears in the above-identified patent and that said Letters Patent is hereby corrected as shown below:

In claim 1, column 5, line 8:

please change:

"$10^3$"

to:

--$10^{-3}$--

Signed and Sealed this

Eighth Day of July, 2008

JON W. DUDAS
*Director of the United States Patent and Trademark Office*